United States Patent
Wu et al.

(10) Patent No.: US 11,753,568 B2
(45) Date of Patent: Sep. 12, 2023

(54) ADHESIVE COMPOSITION AND LIQUID-CRYSTAL DISPLAY AND METHOD OF DISASSEMBLING THE SAME

(71) Applicant: INDUSTRIAL TECHNOLOGY RESEARCH INSTITUTE, Hsinchu (TW)

(72) Inventors: Ming-Tzung Wu, Mailiao Township (TW); Te-Yi Chang, Bade (TW); Yao-Jheng Huang, Taipei (TW); Yu-Chin Lin, Zhudong Township (TW); Chen-Cheng Yu, Taoyuan (TW); Yu-Ying Hsu, Hsinchu (TW); Shuang-Huei Chen, Zhunan Township (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 17/681,994

(22) Filed: Feb. 28, 2022

(65) Prior Publication Data
US 2023/0183533 A1     Jun. 15, 2023

(30) Foreign Application Priority Data
Dec. 9, 2021     (TW) ................. 110146005

(51) Int. Cl.
*C09J 133/08*     (2006.01)
*G02F 1/1335*     (2006.01)
(Continued)

(52) U.S. Cl.
CPC .......... *C09J 133/08* (2013.01); *B32B 43/006* (2013.01); *C08F 292/00* (2013.01); *C08K 3/08* (2013.01);
(Continued)

(58) Field of Classification Search
CPC .............. C09J 133/08; C09J 2203/318; C08K 2201/011; C09K 2323/035; C08F 292/00; G02F 2202/28; B32B 43/006
See application file for complete search history.

(56) References Cited

U.S. PATENT DOCUMENTS

| 3,280,217 A | 10/1966 | Lader et al. |
| 6,133,391 A | 10/2000 | Nielson et al. |

(Continued)

FOREIGN PATENT DOCUMENTS

| CN | 1753963 A | 3/2006 | |
| CN | 100343355 C | * 10/2007 | ................ C08J 9/10 |

(Continued)

OTHER PUBLICATIONS

Chen, Si-Ying, "Surface Plasmon Resonance Enhanced Photocatalytic Reduction of CO2 on the Gold/Silver Decorated Silica Spheres," Department of Chemistry, National Taiwan Normal University Master's Thesis, Jul. 2020, total 61 pages, with an English abstract.

(Continued)

*Primary Examiner* — Sophie Hon
(74) *Attorney, Agent, or Firm* — Birch, Stewart, Kolasch & Birch, LLP

(57) ABSTRACT

An adhesive composition includes 0.1 to 1 part by weight of nano panicles, 50 to 95 parts by weight of acrylate resin, and 5 to 50 parts by weight of a monomer or oligomer of acrylate or acrylic acid containing multi-functional groups, and the acrylate resin and the monomer or oligomer of acrylate or acrylic acid containing multi-functional groups have a total weight of 100 parts by weight, in which the acrylate resin has a weight average molecular weight of 100,000 to 1,500,000. The nano particle has a shell covering parts of the surface of the core, and acrylate groups grafted to the surface of the core.

13 Claims, 1 Drawing Sheet

(51) Int. Cl.
*C08F 292/00* (2006.01)
*C08K 3/36* (2006.01)
*C08K 3/08* (2006.01)
*B32B 43/00* (2006.01)

(52) U.S. Cl.
CPC .......... *C08K 3/36* (2013.01); *G02F 1/133514* (2013.01); *C08K 2003/0831* (2013.01); *C08K 2201/011* (2013.01); *C09J 2203/318* (2013.01); *C09K 2323/035* (2020.08); *G02F 2202/28* (2013.01)

(56) References Cited

U.S. PATENT DOCUMENTS

| | | | |
|---|---|---|---|
| 6,800,366 | B2 | 10/2004 | Chang et al. |
| 6,838,185 | B2 | 1/2005 | Saiki et al. |
| 7,088,511 | B2 | 8/2006 | Trapani et al. |
| 8,389,958 | B2 | 3/2013 | Vo-Dinh et al. |
| 8,993,649 | B2 | 3/2015 | Nagamoto et al. |
| 2005/0181148 | A1 | 8/2005 | Kim et al. |
| 2005/0250248 | A1 | 11/2005 | Buchwalter et al. |
| 2007/0020474 | A1 | 1/2007 | Tosaki et al. |
| 2007/0148485 | A1 | 6/2007 | Kusama et al. |
| 2007/0213449 | A1* | 9/2007 | Lewandowski ........ C09J 133/14 524/556 |
| 2008/0213583 | A1 | 9/2008 | Noguchi et al. |
| 2009/0117378 | A1 | 5/2009 | Hu et al. |
| 2010/0317173 | A1 | 12/2010 | Kanai |
| 2011/0111140 | A1 | 5/2011 | Jang et al. |

FOREIGN PATENT DOCUMENTS

| | | |
|---|---|---|
| CN | 101400755 A | 4/2009 |
| CN | 103525319 B | 3/2015 |
| CN | 104046281 B | 8/2016 |
| CN | 104169386 A | 10/2016 |
| CN | 108258058 A | 7/2018 |
| EP | 2 727 972 A1 | 5/2014 |
| JP | 5-117324 A | 5/1993 |
| JP | 7-120732 A | 5/1995 |
| JP | 7-228850 A | 8/1995 |
| JP | 8-302325 A | 11/1996 |
| JP | 10-279907 A | 10/1998 |
| JP | 5950669 B2 | 7/2016 |
| JP | 6133257 A | 5/2017 |
| TW | I302561 B | 11/2008 |
| TW | I347925 B | 9/2011 |
| TW | I461502 B | 11/2014 |
| TW | 1563046 B | 12/2016 |
| TW | M535642 U | 1/2017 |
| TW | 1606088 B | 11/2017 |
| TW | 1672347 B | 9/2019 |
| TW | 202028401 A | 8/2020 |
| TW | M599250 U | 8/2020 |
| TW | M603830 U | 11/2020 |
| TW | 1715398 B | 1/2021 |
| TW | 1718827 B | 2/2021 |
| TW | I790849 B * | 1/2023 ............. C09J 11/04 |
| WO | WO 2007/029936 A1 | 3/2007 |
| WO | WO 2007/072799 A1 | 6/2007 |
| WO | WO 2008/141004 A1 | 11/2008 |

OTHER PUBLICATIONS

Huiyu et al., "Liquid Phase Fabrication of Nobel Metal Nanomaterials and Their Surface Plasmon Resonance-Based Applications," Progress in Chemistry, vol. 18, No. 7/8, Aug. 2006, pp. 889-896, with an English abstract.

Lin et al., "Fabrication and Biomedical Application of Core-Shell Nanoparticles," Instruments Today, vol. 28, No. 95.8, 2006, pp. 7-16, with an English abstract.

Pham et al., "Preparation and Characterization of Gold Nanoshells Coated with Self-Assembled Monolayers," American Chemical Society, Langmuir, vol. 18, No. 12, Apr. 1, 2002, pp. 4915-4920.

Westcott et al., "Formation and Adsorption of Clusters of Gold Nanoparticles onto Functionalized Silica Nanoparticle Surfaces," American Chemical Society, Langmuir, vol. 14, No. 19, Jul. 1, 1998, pp. 5396-5401.

* cited by examiner

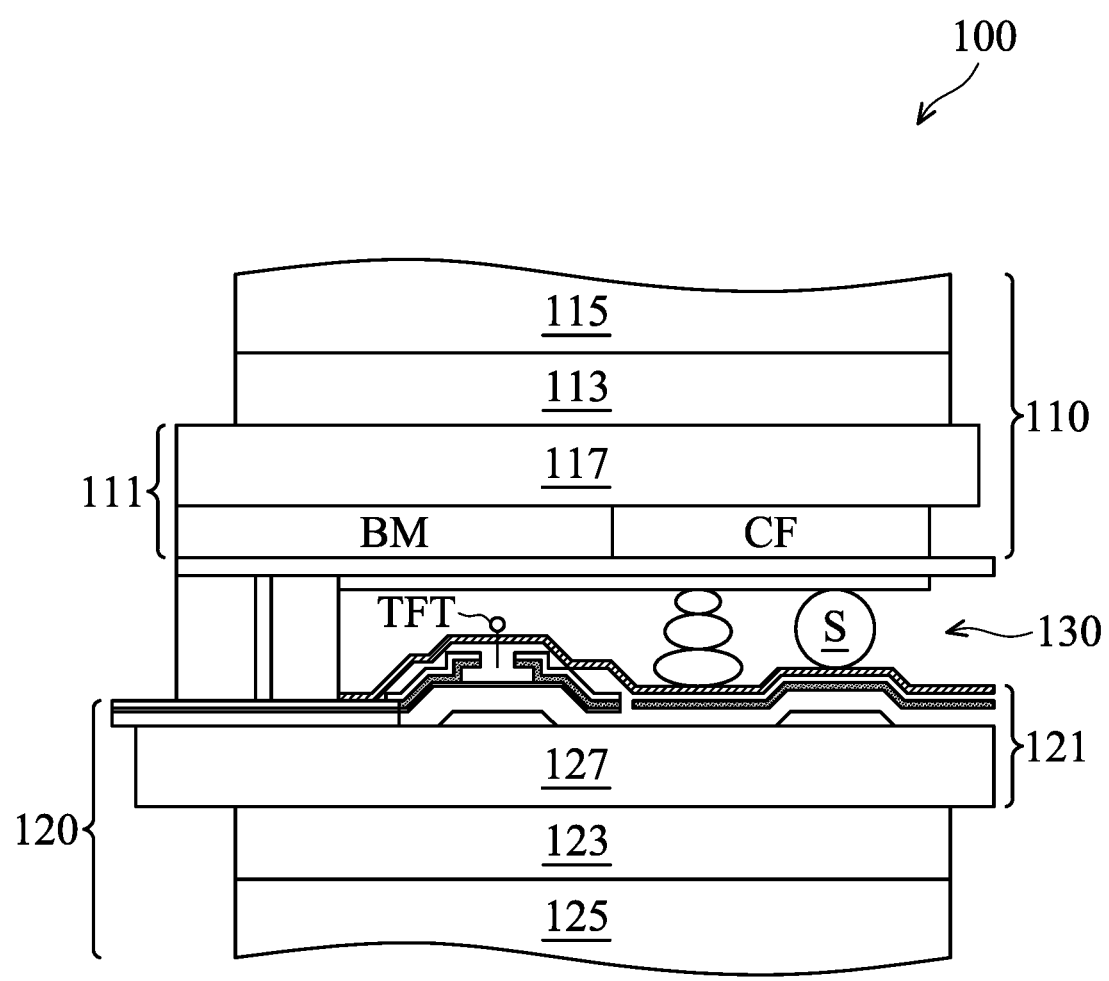

ADHESIVE COMPOSITION AND LIQUID-CRYSTAL DISPLAY AND METHOD OF DISASSEMBLING THE SAME

CROSS REFERENCE TO RELATED APPLICATIONS

The present application is based on, and claims priority from, Taiwan Application Serial Number 110146005, filed on Dec. 9, 2021, the disclosure of which is hereby incorporated by reference herein in its entirety.

TECHNICAL FIELD

The technical field relates to an adhesive composition that can be de-adhered by exposure to a near IR radiation.

BACKGROUND

Conventional optical adhesive glues seek to provide high adhesion force and reliability, and as such are designed to be permanent curing materials. However, the optical adhesive glue cannot be disassembled after adhering. Residues of adhesive glues or damage of the polarizer plate can occur while peeling off the adhesive glue.

Accordingly, a novel adhesive layer is called for to meet the requirements for high transmittance, low haze degree, and a de-adherable property.

SUMMARY

One embodiment of the disclosure provides an adhesive composition, including: 0.1 to 1 part by weight of nano particles; 50 to 95 parts by weight of acrylate resin; and 5 to 50 parts by weight of monomer or oligomer of acrylate or acrylic acid containing multi-functional groups, and the acrylate resin and the monomer or oligomer of acrylate or acrylic acid containing multi-functional groups have a total weight of 100 parts by weight, wherein the acrylate resin has a weight average molecular weight of 100,000 g/mol to 1,500,000 g/mol, wherein the nano particle has a core, a shell, and acrylate groups, the core is silicon oxide, the shell is gold, silver, copper, or a combination thereof, the shell covers parts of the surface of the core, and the acrylate groups graft to the surface of the core, wherein the adhesive composition has an adhesive strength of 0.5 Kg/in to 1.5 Kg/in before exposure to a near IR radiation and an adhesive strength of 0 Kg/in to 0.3 Kg/in after exposure to the near IR radiation.

One embodiment of the disclosure provides a liquid-crystal display, including: a top substrate including a first adhesive layer between a color filter substrate and a top polarizer plate; a bottom substrate including a second adhesive layer between a thin film transistor substrate and a bottom polarizer plate; and a liquid-crystal layer between the color filter substrate of the top substrate and the thin film transistor substrate of the bottom substrate, wherein the first adhesive layer, the second adhesive layer, or both includes the described adhesive composition.

One embodiment of the disclosure provides a method of disassembling a liquid crystal display, including: providing the described liquid-crystal display; separating the top substrate and the bottom substrate and exposing the top substrate, the bottom substrate, or both to the near IR radiation to de-adhere the first adhesive layer, the second adhesive layer, or both.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein:

The FIGURE shows a liquid-crystal display in one embodiment of the disclosure.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

One embodiment of the disclosure provides an adhesive composition, including: 0.1 to 1 part by weight of nano particles, 50 to 95 parts by weight of acrylate resin, and 5 to 50 parts by weight of monomer or oligomer of acrylate or acrylic acid containing multi-functional groups. The acrylate resin and the monomer or oligomer of acrylate or acrylic acid containing multi-functional groups have a total weight of 100 parts by weight. If the amount of the nano particles is too low, the adhesive composition after exposure to a near IR radiation will be almost free of any de-adhering effect. If the amount of the nano particles is too high, the transmittance and the haze degree of the adhesive composition will be negatively affected. If the amount of the acrylate resin is too low (or the amount of the monomer or oligomer of acrylate or acrylic acid containing multi-functional groups is too high), the adhesion of the adhesive composition will be insufficient. If the amount of the acrylate resin is too high (or the amount of the monomer or oligomer of acrylate or acrylic acid containing multi-functional groups is too low), the de-adhering effect of the adhesive composition after exposure to a near IR radiation will be insufficient.

In some embodiments, the acrylate resin has a weight average molecular weight of 100,000 g/mol to 1,500,000 g/mol. If the weight average molecular weight of the acrylate resin is too low, the adhesive composition swill have a poor adhesion to be easily degummed. If the weight average molecular weight of the acrylate resin is too high, the adhesive composition will have an overly high viscosity and cannot be photo de-adhered.

In some embodiments, each of the nano particles has a core, a shell, and acrylate groups. For example, the core is silicon oxide. If the core is another oxide such as titanium oxide or zirconium oxide, the nano particles cannot absorb the light in the Near IR region. In some embodiments, the shell is gold, silver, copper, or a combination thereof, the shell covers pails of the surface of the core, and the acrylate groups grafted to the surface of the core. In some embodiments, the method of grafting the acrylate groups to the surface of the core may utilize a compound having at least one terminal of siloxane group (e.g. Si—OR, R is alkyl group) or silanol group (e.g. Si—OH) and at least one terminal of acrylate group. The compound may react with the Si—OH groups on the surface of the core. For example, the compound can be 3-methacryloxypropyltrimethoxysilane, 3-methacryloxypropylmethyldiethoxy silane, 3-methacryloxypropyltriethoxysilane, 3-acryloxypropyltrimethoxysilane, or a combination thereof. In some embodiments, the core and the shell have a weight ratio of 50:100 to 100:100, or 50:100 to 95:100. If the shell amount is too low, the de-adhering effect of the adhesive composition after exposure to the near IR radiation will be insufficient. If the shell amount is too high, the amount of the acrylate groups grafted to the surface of the core will be too low, and the nano particles cannot be efficiently dispersed in the adhesive composition. In some embodiments, the core and the acrylate groups have a weight ratio of 60:100 to 110:100, or 70:100 to 100:100. If the amount of the acrylate groups is too low, the nano particles cannot be efficiently dispersed in the adhesive composition. If the amount of the acrylate groups is too high, the amount of the shell wrapping the core swill be too low, and the de-adhering effect of the adhesive composition after exposure to the near IR radiation swill be insufficient.

In some embodiments, the adhesive composition has an adhesive strength of 0.5 Kg/in to 1.5 Kg/in before exposure to the near IR radiation and an adhesive strength of 0 to 0.3 Kg/in after exposure to the near IR radiation. If the adhesive force of the adhesive composition before exposure to the near IR radiation is too low, the adhesive composition cannot adhere the desired layers (e.g. a glass substrate and a polarizer plate). If the adhesive force of the adhesive composition after exposure to the near IR radiation s too high, it means that the adhesive composition hill not be de-adhered or insufficiently de-adhered, and the adhesive composition will remain on the adhered layers.

In some embodiments, the nano particles have a size of 10 nm to 200 nm, or 50 nm to 200 nm. If the nano particles are too small, the de-adhering effect of the adhesive composition after exposure to the near IR radiation will be insufficient. If the nano particles are too large, the transmittance and the haze degree of the adhesive composition will be negatively affected.

In some embodiments. monomers of the acrylate resin include 50 wt % to 99 wt % of a first monomer having Tg of −15° C. to −70° C., and 1 wt % to 50 wt % of a second monomer having Tg of higher than −15° C. If the amount of the first monomer is too low (e.g. the amount of the second monomer is too high), the viscosity of the adhesive composition cannot be increased to meet the specification of the viscosity. If the amount of the first monomer is too high (e.g. the amount of the second monomer is too low), the viscosity of the adhesive composition will be too high to easily de-adhere the adhesive composition.

In some embodiments, the first monomer includes ethyl acrylate, ethylhexyl acrylate, butyl acrylate, isooctyl acrylate, isobutyl acrylate, isodecyl acrylate, lauryl acrylate, 2-propylhepty acrylate, heptadecyl acrylate, tetrahydrofuranyl acrylate, 2-(2-ethoxyethoxy)ethyl acrylate, methoxy poly(ethylene glycol) acrylate, isodecyl methacrylate, lauryl methacrylate, isotridecyl methacrylate, methoxy poly(ethylene glycol) methacrylate, or a combination thereof. For example, the first monomer includes butyl acrylate and ethylhexyl acrylate.

In some embodiments, the second monomer includes vinyl acetate, acrylonitrile, acrylamide, styrene, methyl methacrylate, methyl acrylate, methacrylic acid, acrylic acid, hydroxyethyl acrylate, hydroxypropyl acrylate, glycidyl methacrylate, or a combination thereof. For example, the second monomer includes methyl methacrylate, acrylic acid, and hydroxyethyl acrylate.

In some embodiments, the acrylate or acrylic acid containing multi-functional groups comprises 1,6-hexanediol diacrylate, 1,9-nonanediol diacrylate, 1,10-decanediol diacrylate, neopentyl glycol diacrylate, 2-hydroxy-3-propyl methacrylate, poly(ethylene glycol) diacrylate, di(propylene glycol) diactylate, tri(propylene glycol) diacrylate, poly(propylene glycol) diacrylate, poly(tetramethylene ether glycol) diactylate, poly(ethylenepolypropylene glycol) diacrylate, di(alkylene glycol) diacrylate, tricyclo[5.2.1.0(2,6)] decanedimethanol diacrylate, trimethylolpropane triacrylate, pentaerythritol triacrylate, pentaerythritol tetracrylate, di(trimethylolpropane) tetraacrylate, di(polypentaervthritol) polyacrylate, polypentaerythritol polyacrylate, 1,6-hexanediol dimethacrylate, 1,9-nonanediol dimethacrylate, 1,10-decanediol dimethacrylate, neopentyl glycol dimethacrylate, or a combination thereof.

In some embodiments, the adhesive composition further includes a thermal initiator. For example, the thermal initiator can be peroxide or diazo compound, such as benzoyl peroxide, di-(2-ethylhexyl)peroxydicarbonate, dimyristyl peroxydicarbonate, dilauryl peroxide, decanoyl peroxide, 2,5-dimethyl-2,5-di(2-ethylhexanoylperoxy)hexane, 1,1,3,3-tetramethylbutyl peroxy-2-ethylhexanoate, tert-pentyl peroxy-2-ethylhexanoate, tert-butyl peroxy-2-ethylhexanoate, tert-butyl peroxy-diethylacetate, tert-butyl peroxyisobutyrate, 1,1-di(tert-butylperoxy)-3,3,5-trimethylcyclohexane, azobisisobutyronitrile, 2,2'-azobis(2-methylbutyronitrile), or 1,1'-azobis(cyanocyclohexane).

In some embodiments, the near IR radiation for exposing the adhesive composition to de-adhere it may have an energy intensity of 1500 mJ/cm$^2$ to 2500 mJ/cm$^2$. For example, the near IR radiation has a wavelength of 800 nm to 1500 nm. If the energy intensity of the near IR radiation is too low, it cannot de-adhere the adhesive composition. If the energy intensity of the near IR radiation is too high, the objects adhered by the adhesive composition (e.g. the polarizer plate, the color filter substrate, or the thin film transistor substrate) will be damaged. Note that the near IR radiation needs a certain energy intensity to achieve the effect of de-adhering the adhesive composition. For example, even if the near IR radiation is existed in the environmental light, the general near IR radiation of low energy intensity will not de-adhere the adhesive composition to cause damages to the device containing the adhesive composition.

As shown in the FIGURE, one embodiment of the disclosure provides a liquid-crystal display 100 including a top substrate 110 and a bottom substrate 120. The top substrate 110 includes a first adhesion layer 113 between a color filter substrate 111 and a top polarizer plate 115, and the bottom substrate 120 includes a second adhesive layer 123 between a thin film transistor substrate 121 and a bottom polarizer plate 125. The liquid-crystal display 100 also includes a liquid-crystal layer 130 between the color filter substrate 111 of the top substrate and the thin film transistor substrate 121 of the bottom substrate 120. In some embodiments, the first adhesive layer 113, the second adhesive layer 123, or both include the described adhesive composition. In the FIGURE, the color filter substrate 111 comprises a glass substrate 117 and a color filter CF (containing a black matrix BM) formed thereon. The thin film transistor substrate 121 includes a thin film transistor TFT and a glass substrate 127. In some embodiments, the top substrate 110 and the bottom substrate 120 can be separated by a spacer S to define the thickness of the liquid-crystal layer 130. Note that the liquid-crystal display 100 in the FIGURE is only for illustration. When the polarizer plate and the glass substrate are adhered by the adhesive composition of the disclosure, one skilled in the art may utilize any kinds of liquid-crystal display to achieve the described effect of the disclosure.

One embodiment of the disclosure provides a method of disassembling a liquid-crystal display, including: providing the liquid-crystal display 100 as shown in the FIGURE; separating the top substrate 110 and the bottom substrate 120; and exposing the top substrate 110, the bottom substrate 120, or both to the near IR radiation to de-adhere the first adhesive layer 113, the second adhesive layer 123, or both. As such, the top polarizer plate 115, the bottom polarizer 125, or both can be separated from the top substrate 110, the bottom substrate 120, or both without the problem of glue residue. As shown above, if the adhesive composition of the disclosure is adopted, the adhesive layer can be easily de-adhered by exposure to the NIR radiation during recycling or re-working for achieving the effect of disassembling the liquid-crystal display.

In some embodiments, the acrylate resin and the monomer or oligomer of acrylate or acrylic acid containing multi-functional groups is free of any epoxy group or isocyanate group, such that the adhesive composition after exposure to the near IR radiation is easily de-adhered.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Synthesis Example 1

55 parts by weight of butyl acrylate, 23 parts by weight of ethylhexyl acrylate, 10 parts by weight of methyl methacrylate, 8 parts by weight of acrylic acid, 4 parts by weight of hydroxyethyl acrylate, 0.3 parts by weight of benzoyl peroxide, and 150 parts by weight of ethyl acetate were mixed, and then heated to 80° C. and stirred at 250 rpm to react for 6 hours for obtaining an acrylate resin. The acrylate resin had a solid content of about 40%, a weight average molecular weight of 500,000 to 800,000 (analyzed with GPC commercially available from Waters, which was calibrated by the standard polystyrene for every use), and a viscosity of 6000 cps to 15000 cps (analyzed with Brookfield viscometer). The acrylate resin was coated onto a PET substrate and then put into an oven at 50° C. for 5 minutes to be dried, thereby obtaining a dry titan with a thickness of 20 µm to 25 µm. The dry film was attached to a stainless steel plate (10 cm*10 cm) to measure its adhesion force (1.4 Kg/in, measured according to the standard JISZO237).

Synthesis Example 2

50 g of $SiO_2$ dispersion (nano sol commercially available from Chang Chun Petrochemical Co., Ltd., 20 wt %, dispersed in water, average diameter was 30±6 nm), 13.5 g of 3-(trimethoxysilyl)-propyl methacrylate, and 1.5 g of 3-aminopropyl triethoxy silane were mixed and reacted at 40° C. for 4 hours, and then cooled to room temperature and continuously stirred for 48 hours, thereby forming a silicon core with the surface grafted with acrylate groups (e.g. methacrylate) and amino groups, Thereafter, chloroauric acid ($HAuCl_4$) was added to the above solution, sodium citrate was then added to the solution, and $NH_2OH \cdot HCl$ was then added to the solution to chemically reduce the chloroauric acid, thereby forming a gold shell wrapping parts of the silicon oxide core, e.g. composite particles of $SiO_2$/Au core-shell structure having a surface grafted with the acrylate groups. The $SiO_2$ core and the Au shell had a weight ratio of 80:100, and the $SiO_2$ core and the grafting acrylate groups had a weight ratio of 95:100. The composite particles were nanometer scaled, which had an average diameter of about 150 nm. The dispersion could be further diluted or condensed to obtain a dispersion having a desired concentration of 1%, 5% or 10%.

Comparative Example 1

80 g of the acrylate resin in Synthesis Example 1, 20 g of polydipentaerythritol hexaacrylate serving as the acrylate containing multi-functional groups, and 0.5 g of benzoyl peroxide serving as the thermal initiator were evenly stirred for 24 hours, then coated on a polarizer plate by blade-coating, and then put into an oven at 50° C. for 5 minutes to be dried, thereby obtaining a dry film, i.e. the adhesive composition, with a thickness of 20 µm to 25 µm. The dry film had a transmittance of 92% (measured with a UV-VIS spectrophotometer) and a haze degree of 0.45% (measured with a haze meter). The dry film was attached to a stainless steel plate (10 cm*10 cm) to measure its adhesion force (1.2 Kg/in, measured according to the standard JISZO237). The polarizer plate was exposed to the near IR radiation having a wavelength of 800 nm to 1500 nm, a power of 2 kW, and an intensity of 2000 mJ/cm$^2$ to de-adhere the dry film. The exposed dry film had an adhesion force of 1.2 Kg/in (measured according to the standard JISZO237), which means no de-adhering effect.

Example 1-1

80 g of the acrylate resin in Synthesis Example 1, 20 g of polydipentaerythritol hexaacrylate serving as the acrylate containing multi-functional groups, 0.5 g of the dispersion of the composite particles of $SiO_2$/Au core-shell structure having a surface grafted to the acrylate groups in Synthesis Example 2 (containing 1% composite particles), and 0.5 g of benzoyl peroxide serving as the thermal initiator were evenly stirred for 24 hours, then coated on a polarizer plate by blade-coating, and then put into an oven at 50° C. for 5 minutes to be dried, thereby obtaining a dry film, i.e. the adhesive composition, with a thickness of 20 µm to 25 µm. The dry film had a transmittance of 90% (measured with a UV-VIS spectrophotometer) and a haze degree of 0.5% (measured with a haze meter). The dry film was attached to a stainless steel plate (10 cm*10 cm) to measure its adhesion force (1.2 Kg/in, measured according to the standard JISZO237). The polarizer plate was exposed to the near IR radiation having a wavelength of 800 nm to 1500 nm, a power of 2 kW, and an intensity of 2000 mJ/cm$^2$ to de-adhere the dry film. The de-adhered dry film had an adhesion force of 0.2 Kg/in (measured according to the standard JISZO237). Accordingly, the adhesive composition in Example 1-1 had the sufficient adhesion force, and the adhesion force was dramatically decreased after exposure to the near IR radiation of high energy (e.g. could be de-adhered by the near IR radiation).

Example 1-2

80 g of the acrylate resin in Synthesis Example 1, 20 g of polyclipentaerythritol hexaacrylate serving as the acrylate containing multi-functional groups, 0.5 g of the dispersion of the composite particles of $SiO_2$/Au core-shell structure having a surface grafted to the acrylate groups in Synthesis Example 2 (containing 5% composite particles), and 0.5 g of benzoyl peroxide serving as the thermal initiator were evenly stirred for 24 hours, then coated on a polarizer plate by blade-coating, and then put into an oven at 50° C. for 5 minutes to be dried, thereby obtaining a dry film i.e. the adhesive composition, with a thickness of 20 µm to 25 µm. The dry film had a transmittance of 92% (treasured with a UV-VIS spectrophotometer) and a haze degree of 0.41% (measured with a haze meter). The dry film was attached to a stainless steel plate (10 cm*10 cm) to measure its adhesion force (1.2 Kg/in, measured according to the standard JISZO237). The polarizer plate was exposed to the near IR radiation having a wavelength of 800 nm to 1500 nm, a power of 2 kW, and an intensity of 2000 mJ/cm$^2$ to de-adhere the dry film. The de-adhered dry film had an adhesion force of 0.05 Kg/in (measured according to the standard JISZO237). Accordingly, the adhesive composition in Example 1-2 had the sufficient adhesion force, and the adhesion force was dramatically decreased after exposure to the near IR radiation of high energy (e.g. could be de-adhered by the near IR radiation).

Example 1-3

80 g of the acrylate resin in Synthesis Example 1, 20 g of polydipentaerythritol hexaacrylate serving as the acrylate containing multi-functional groups, 0.5 g of the dispersion of the composite particles of SiO$_2$/Au core-shell structure having a surface grafted to the acrylate groups (containing 10% composite particles), and 0.5 g of benzoyl peroxide serving as the thermal initiator were evenly stirred for 24 hours, then coated on a polarizer plate by blade-coating, and then put into an oven at 50° C. for 5 minutes to be dried, thereby obtaining a dry film, i.e. the adhesive composition, with a thickness of 20 µm to 25 µm. The dry film had a transmittance of 91% (measured with a UV-VIS spectrophotometer) and a haze degree of 0.48% (measured with a haze meter). The dry film was attached to a stainless steel plate (10 cm*10 cm) to measure its adhesion force (0.9 Kg/in, measured according to the standard JISZO237). The polarizer plate was exposed to the near IR radiation having a wavelength of 800 nm to 1500 nm, a power of 2 kW, and an intensity of 2000 mJ/cm$^2$ to de-adhere the dry film. The de-adhered dry film had an adhesion force of 0.05 Kg/in (measured according to the standard JISZO237). Accordingly, the adhesive composition in Example 1-3 had the sufficient adhesion force, and the adhesion force was dramatically decreased after exposure to the near IR radiation of high energy (e.g. could be de-adhered by the near IR radiation).

Comparative Example 2

80 g of the synthesized resin HT-6501 BS (commercially available from J. C. silicone Co., Ltd.) was coated on a polarizer plate by blade-coating, and then put into an oven at 50° C. for 5 minutes to be dried, thereby obtaining a dry film, i.e. the adhesive composition, with a thickness of 20 µm to 25 µm. The dry film had a transmittance of 92% (measured with a UV-VIS spectrophotometer) and a haze degree of 0.45% (measured with a haze meter). The dry film was attached to a stainless steel plate (10 cm*10 cm) to measure its adhesion force (2.9 Kg/in, measured according to the standard JISZO237). The polarizer plate was exposed to the near IR radiation having a wavelength of 800 nm to 1500 nm, a power of 2 kW, and an intensity of 2000 mJ/cm$^2$ to de-adhere the dry film. The exposed dry film had an adhesion force of 2.9 Kg/in (measured according to the standard JISZO237). Accordingly, the adhesive composition in Comparative Example 2 had the sufficient adhesion force, but the adhesion force was the same after exposure to the near IR radiation of high energy (e.g. could not be de-adhered by the near IR radiation).

Comparative Example 3-1

80 g of the synthesized resin 77688 (commercially available from Eternal Materials Co., Ltd.) was coated on a polarizer plate by blade-coating, and then put into an oven at 50° C. for 5 minutes to be dried, thereby obtaining a dry film, i.e. the adhesive composition, with a thickness of 20 µm to 25 µm. The dry film had a transmittance of 92% (measured with a UV-VIS spectrophotometer) and a haze degree of 0.45% (measured with a haze meter). The dry film was attached to a stainless steel plate (10 cm*10 cm) to measure its adhesion force (1.5 Kg/in, measured according to the standard JISZO237). The polarizer plate was exposed to the near IR radiation having a wavelength of 800 nm to 1500 nm, a power of 2 kW, and an intensity of 2000 mJ/cm$^2$ to de-adhere the dry film. The exposed dry film had an adhesion force of 1.5 Kg/in (measured according to the standard JISZO237), Accordingly, the adhesive composition in Comparative Example 3-1 had the sufficient adhesion force, but the adhesion force was the same after exposure to the near IR radiation of high energy (e.g. could not be de-adhered by the near IR radiation).

Comparative Example 3-2

80 g of the synthesized resin 77688 (commercially available from Eternal Materials Co., Ltd.) and 20 g of polydipentaerythritol hexaacrylate serving as the acrylate containing multi-functional groups were evenly stirred for 24 hours, then coated on a polarizer plate by blade-coating, and then put into an oven at 50° C., for 5 minutes to be dried, thereby obtaining a dry film, i.e. the adhesive composition, with a thickness of 20 µm to 25 µm. The dry film had a transmittance of 92% (measured with a UV-VIS spectrophotometer) and a haze degree of 0.43% (measured with a haze meter). The dry film was attached to a stainless steel plate (10 cm*10 cm) to measure its adhesion force (1.3 Kg/in, measured according to the standard JISZO237). The polarizer plate was exposed to the near IR radiation having a wavelength of 800 nm to 1500 nm, a power of 2 kW, and an intensity of 2000 mJ/cm$^2$ to de-adhere the dry film. The exposed dry film had an adhesion force of 1.3 Kg/in (measured according to the standard JISZO237). Accordingly, the adhesive composition in Comparative Example 3-2 had the sufficient adhesion force, but the adhesion force was the same after exposure to the near IR radiation of high energy (e.g. could not be de-adhered by the near IR radiation).

Comparative Example 3-3

80 g of the synthesized resin 77688 (commercially available from Eternal Materials Co., Ltd.), 20 g of polydipentaerythritol hexaacrylate serving as the acrylate containing multi-functional groups, 0.5 g of the dispersion of the composite particles of SiO$_2$/Au core-shell structure having a surface grafted to the acrylate groups in Synthesis Example 2 (containing 1% composite particles), and 0.5 g of benzoyl peroxide serving as the thermal initiator were evenly stirred for 24 hours, then coated on a polarizer plate by blade-coating, and then put into an oven at 50° C. for 5 minutes to be dried, thereby obtaining a dry film, i.e. the adhesive composition, with a thickness of 20 μm to 25 μm. The dry film had a transmittance of 92% (measured with a UV-VIS spectrophotometer) and a haze degree of 0.6% (measured with a haze meter). The dry film was attached to a stainless steel plate (10 cm*10 cm) to measure its adhesion force (1.2 Kg/in, measured according to the standard JISZO237). The polarizer plate was exposed to the near IR radiation having a wavelength of 800 nm to 1500 nm, a power of 2 kW, and an intensity of 2000 mJ/cm$^2$ to de-adhere the dry film. The exposed dry film had an adhesion force of 1.2 Kg/in (measured according to the standard JISZO237), Accordingly, the adhesive composition in Comparative Example 3-3 had the sufficient adhesion force, but the adhesion force was the same after exposure to the near IR radiation of high energy (e.g. could not be de-adhered by the near IR radiation). As shown above, not all the synthesized resin could be combined with the core-shell composite particles and the monomer of the acrylate containing multi-functional groups to form the adhesive composition for being de-adhered by exposure to the near IR radiation.

Comparative Example 3-4

80 g of the synthesized resin 77688 (commercially available from Eternal Materials Co., Ltd.), 20 g of polydipentaerythritol hexaacrylate serving as the acrylate containing multi-functional groups, 0.5 g of the dispersion of the composite particles of SiO$_2$/Au core-shell structure having a surface grafted to the acrylate groups in Synthesis Example 2 (containing 5% composite particles), and 0.5 g of benzoyl peroxide serving as the thermal initiator were evenly stirred for 24 hours, then coated on a polarizer plate by blade-coating, and then put into an oven at 50° C. for 5 minutes to be dried, thereby obtaining a dry film, i.e. the adhesive composition, with a thickness of 20 μm to 25 μm. The dry film had a transmittance of 91% (measured with a UV-VIS spectrophotometer) and a haze degree of 0.8% (measured with a haze meter). The dry film was attached to a stainless steel plate (10 cm*10 cm) to measure its adhesion force (1.1 Kg/in, measured according to the standard JISZO237). The polarizer plate was exposed to the near IR radiation having a wavelength of 800 nm to 1500 nm, a power of 2 kW, and an intensity of 2000 mJ/cm$^2$ to de-adhere the dry film. The exposed dry film had an adhesion force of 1.1 Kg/in (measured according to the standard JISZO237), Accordingly, the adhesive composition in Comparative Example 3-4 had the sufficient adhesion force, but the adhesion force was the same after exposure to the near IR radiation of high energy (e.g. could not be de-adhered by the near IR radiation). As shown above, not all the synthesized resin could be combined with the core-shell composite particles and the monomer of the acrylate containing multi-functional groups to form the adhesive composition for being de-adhered by exposure to the near IR radiation.

Comparative Example 3-5

80 g of the synthesized resin 77688 (commercially available from Eternal Materials Co., Ltd.), 20 g of polydipentaerythritol hexaacrylate serving as the acrylate containing multi-functional groups, 0.5 g of the dispersion of the composite particles of SiO$_2$/Au core-shell structure having a surface grafted to the acrylate groups in Synthesis Example 2 (containing 10% composite particles), and 0.5 g of benzoyl peroxide serving as the thermal initiator were evenly stirred for 24 hours, then coated on a polarizer plate by blade-coating, and then put into an oven at 50° C. for 5 minutes to be dried, thereby obtaining a dry film with a thickness of 20 μm to 25 μm (e.g. the adhesive composition). The dry film had a transmittance of 89% (measured with a UV-VIS spectrophotometer) and a haze degree of 1.6% (measured with a haze meter). The dry film was attached to a stainless steel plate (10 cm*10 cm) to measure its adhesion force (1.0 Kg/in, measured according to the standard JISZO237). The polarizer plate was exposed to the near IR radiation having a wavelength of 800 nm to 1500 nm, a power of 2 kW, and an intensity of 2000 mJ/cm$^2$ to de-adhere the dry film. The exposed dry film had an adhesion force of 1.0 Kg/in (measured according to the standard JISZO237), Accordingly, the adhesive composition in Comparative Example 3-5 had the sufficient adhesion force, but the adhesion force was the same after exposure to the near IR radiation of high energy (e.g. could not be de-adhered by the near IR radiation). As shown above, not all the synthesized resin could be combined with the core-shell composite particles and the monomer of the acrylate containing multi-functional groups to form the adhesive composition for being de-adhered by exposure to the near IR radiation.

It will be apparent to those skilled in the art that various modifications and variations can be lade to the disclosed methods and materials. It is intended that the specification and examples be considered as exemplary only, with the true scope of the disclosure being indicated by the following claims and their equivalents.

What is claimed is:

1. An adhesive composition, comprising:
    0.1 to 1 part by weight of nano particles;
    50 to 95 parts by weight of acrylate resin; and
    5 to 50 parts by weight of a monomer or oligomer, of acrylate or acrylic acid, containing multi-functional groups,
    wherein the acrylate resin and the monomer or oligomer, of acrylate or acrylic acid, containing multi-functional groups, have a total weight of 100 parts by weight,
    wherein the acrylate resin has a weight average molecular weight of 100,000 to 1,500,000,
    wherein each of the nano particles has a core, a shell, and acrylate groups, where the core is silicon oxide, the shell is gold, silver, copper, or a combination thereof, and where the shell covers parts of the surface of the core, and the acrylate groups are grafted to the surface of the core,
    wherein the adhesive composition has an adhesive strength of 0.5 Kg/in to 1.5 Kg/in, when attached to a 10 cm by 10 cm stainless steel plate, as measured according to the standard JIS Z 0237 test method, without any further treatment and before exposure to a near IR radiation;
    and an adhesive strength of 0 to 0.3 Kg/in after exposure to the near IR radiation, where the near IR radiation has a wavelength of 800 nm to 2,500 nm, a power of 2 kW, and an intensity of 1,500 mJ/cm$^2$ to 2,500 mJ/cm$^2$.

2. The adhesive composition as claimed in claim 1, wherein the core and the shell have a weight ratio of 50:100 to 100:100.

3. The adhesive composition as claimed in claim 1, wherein the core and the acrylate groups have a weight ratio of 60:100 to 110:100.

4. The adhesive composition as claimed in claim 1, wherein the nano particles have a size of 10 nm to 200 nm.

5. The adhesive composition as claimed in claim 1, wherein monomers of the acrylate resin include 50 wt % to 99 wt % of a first monomer having Tg of −15° C. to −70° C., and 1 wt % to 50 wt % of a second monomer having Tg of higher than −15° C.

6. The adhesive composition as claimed in claim 5, wherein the first monomer comprises ethyl acrylate, ethylhexyl acrylate, butyl acrylate, isooctyl acrylate, isobutyl acrylate, isodecyl acrylate, lauryl acrylate, 2-propylhepty acrylate, heptadecyl acrylate, tetrahydrofuranyl acrylate, 2-(2-ethoxyethoxy)ethyl acrylate, methoxy poly(ethylene glycol) acrylate, isodecyl methacrylate, lauryl methacrylate, isotridecyl methacrylate, methoxy poly(ethylene glycol) methacrylate, or a combination thereof.

7. The adhesive composition as claimed in claim 6, wherein the first monomer comprises butyl acrylate and ethylhexyl acrylate.

8. The adhesive composition as claimed in claim 5, wherein the second monomer comprises vinyl acetate, acrylonitrile, acrylamide, styrene, methyl methacrylate, methyl acrylate, methacrylic acid, acrylic acid, hydroxyethyl acrylate, hydroxypropyl acrylate, glycidyl methacrylate, or a combination thereof.

9. The adhesive composition as claimed in claim 8, wherein the second monomer comprises methyl methacrylate, acrylic acid, and hydroxyethyl acrylate.

10. The adhesive composition as claimed in claim 1, wherein the acrylate or acrylic acid containing multi-functional groups comprises 1,6-hexanediol diacrylate, 1,9-nonanediol diacrylate, 1,10-decanediol diacrylate, neopentyl glycol diacrylate, 2-hydroxy-3-propyl methacrylate, poly(ethylene glycol) diacrylate, di(propylene glycol) diacrylate, tri(propylene glycol) diacrylate, poly(propylene glycol) diacrylate, poly(tetramethylene ether glycol) diacrylate, poly(ethylenepolypropylene glycol) diacrylate, di(alkylene glycol) diacrylate, tricyclo[5.2.1.0(2,6)] decanedimethanol diacrylate, trimethylolpropane triacrylate, pentaerythritol triacrylate, pentaerythritol tetraacrylate, di(trimethylolpropane) tetraacrylate, di(polypentaerythritol) polyacrylate, polypentaerythritol polyacrylate, 1,6-hexanediol dimethacrylate, 1,9-nonanediol dimethacrylate, 1,10-decanediol dimethacrylate, neopentyl glycol dimethacrylate, or a combination thereof.

11. The adhesive composition, further comprising a thermal initiator.

12. A liquid-crystal display, comprising:
   a top substrate including a first adhesive layer between a color filter substrate and a top polarizer plate;
   a bottom substrate including a second adhesive layer between a thin film transistor substrate and a bottom polarizer plate; and
   a liquid-crystal layer between the color filter substrate of the top substrate and the thin film transistor substrate of the bottom substrate,
   wherein the first adhesive layer, the second adhesive layer, or both include the adhesive composition as claimed in claim 1.

13. A method of disassembling a liquid-crystal display, comprising:
   providing the liquid-crystal display as claimed in claim 12;
   separating the top substrate and the bottom substrate; and
   exposing the top substrate, the bottom substrate, or both to the near IR radiation to de-adhere the first adhesive layer, the second adhesive layer, or both.

* * * * *